Jan. 4, 1966  R. SPALTEN  3,226,827
DENTAL APPARATUS
Filed Dec. 13, 1962
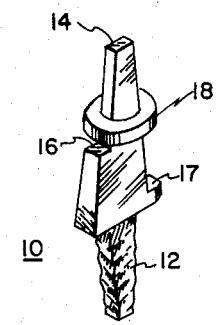
FIG. 1.
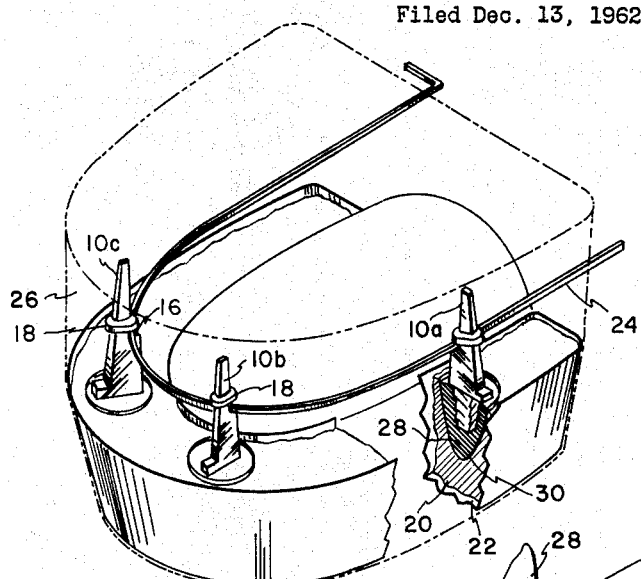
FIG. 2.
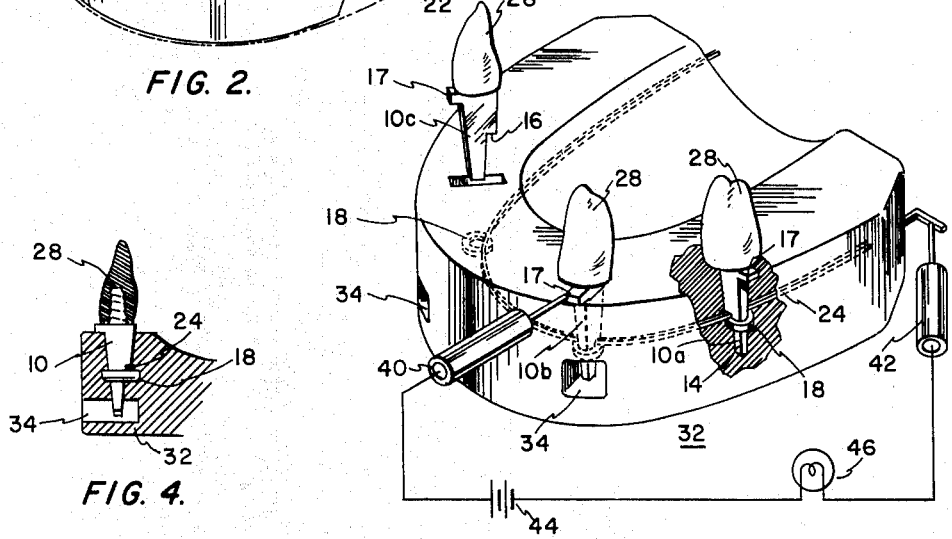
FIG. 4.
FIG. 3.
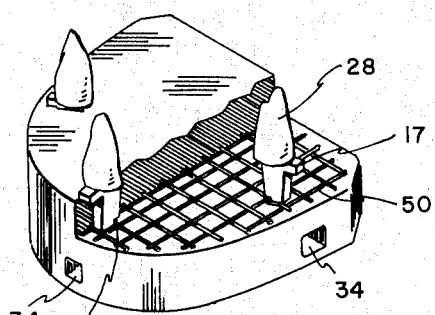
FIG. 5.
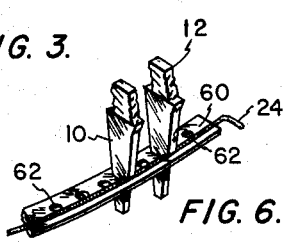
FIG. 6.
INVENTOR.
ROBERT SPALTEN
BY R. J. Frank
ATTORNEY

United States Patent Office 3,226,827
Patented Jan. 4, 1966

3,226,827
DENTAL APPARATUS
Robert Spalten, 333 Central Park W., New York, N.Y.
Filed Dec. 13, 1962, Ser. No. 244,335
3 Claims. (Cl. 32—11)

This invention relates to dental appliances and in particular to apparatus for precisely supporting and positioning replicas of the teeth in a model of the mouth.

In Patent 2,851,728 issued September 16, 1958 to R. Spalten et al., there is disclosed a method useful in preparing precision splints, indirect inlays, crowns and large-span bridgework in order to obtain full rehabilitation of the mouth. As disclosed in this patent, a rubber impression of the teeth is mounted on a tray inside a wax box. The impression has recesses corresponding to the patient's teeth, the shape of the inside of each recess being the negative of the shape of the outside of the corresponding tooth. Dowel pins are then suspended in the recesses by repositioning gauges, or rods, which pass through holes in the pins and are supported at their ends by the wax box. Die material is next poured into the recesses in the rubber impression, the die material adhering to the end of each dowel pin and assuming the shape of the tooth. Stone (plaster of Paris) is placed in the wax box and allowed to harden forming a cast or model. When the stone has hardened, the repositioning gauge may be removed and the dowel pins withdrawn from the cast. The dowel pins may be accurately reseated by replacing them in the cast and reinserting the repositioning gauge in the dowel pin holes.

The described method is quite satisfactory when the dowel pins and repositioning gauges are relatively new. However, I have found that after the dowel pins have been removed from the cast and replaced a number of times, the holes in the pins tend to enlarge and the gauges tend to wear. As a result, dirt or other foreign matter may be lodged in the cast and prevent the dowel pins from seating properly although the repositioning gauge still fits through the dowel pin holes. Consequently, a bridge or other appliance formed by use of the stone model and dowel pins may not fit properly on the patient's teeth. Further, the worn dowel pins and repositioning gauges cannot be reused.

Accordingly it is an object of my invention to provide an improved apparatus for positively supporting dowel pins in the impression while the die material is setting.

Still another object is to provide an apparatus for reseating dowel pins which may be used repeatedly without loss of accuracy.

Yet another object is to provide a means for accurately determining whether each individual dowel pin has been seated properly in the cast.

A further object is to provide apparatus for reseating dowel pins which is not subject to wear.

In the present invention, dental apparatus is provided which consists of a cast having a plurality of sockets corresponding to the positions of teeth in the mouth. A fixed electrically conductive member is rigidly embedded inside the cast and positioned within each of the sockets. A plurality of electrically conductive dowel pins are also included which fit into corresponding sockets in the cast, one end of each of the dowel pins being formed in the shape of a tooth. Each pin is provided with an electrically conductive contact surface which mates with the portion of the fixed conducting member passing through its socket.

When the dowel pin is fully inserted in the corresponding socket, electrical contact is made between the contact surface and the fixed electrically conductive member; if the dowel pin is not fully inserted, no electrical contact is made. Thus, when a voltage source is connected between a dowel pin and the electrically conductive member, current flows only if the pin has been properly seated but does not flow when the dowel pin has been improperly positioned in the socket.

The above objects of and the brief introduction to the present invention will be more fully understood and further objects and advantages will become apparent from a study of the following description in connection with the drawings, wherein:

FIG. 1 is a view of a dowel pin suitable for use with my invention;

FIG. 2 is a cutaway perspective view showing the dowel pins inserted in the recesses in the rubber impression;

FIG. 3 is a view of the stone cast showing the method of checking the dowel pins for proper seating;

FIG. 4 is a cross-sectional view of a dowel pin seated in the cast;

FIG. 5 shows another embodiment of my invention, and

FIG. 6 depicts a modification of the conductive member shown in FIGS. 2–4.

Referring to FIG. 1, there is shown a tapered metallic dowel pin 10 having a knurled stem 12 and an end 14. On one side of the body of the pin there is provided a flat, indented electrical contact surface 16 and on the other side there is a metallic spur 17. A resilient plastic ring 18, which may be made of polyethylene, fits snugly around dowel pin 10 just above the electrical contact surface 16.

FIG. 2 shows a step in the preparation of a stone cast for holding the dowel pins. For clarity, only three dowel pins have been shown in the drawing, although more may be used. A rubber impression 20 is made of the teeth in the mouth and placed on a tray 22. Dowel pins 10a, 10b, and 10c are suspended from a U-shaped flat, electrically conductive wire 24 which is supported by the sides of a wax box 26 (shown by dashed lines). The wire 24 is held securely to the dowel pins 10a–10c by supporting the lower side on the contact surface 16 and by sliding the plastic ring 18 over the tapered body of the pin until it presses against the upper side of the wire. With the dowel pins supported by the wire 24, die material 28 is poured over a thin silver plating 30 into the recesses in rubber impression 20 as shown in the cutaway view of dowel pin 10a in FIG. 2. The die material may be a metal such as copper or it may be an epoxy resin or acrylic loaded with silver or copper powder to make it conductive. When the die material hardens, its outer surface is a replica of the tooth which had formed the recess in rubber impression 20.

Plaster of Paris (hereinafter called stone) is next poured into wax bore 26 producing, after removal of the wax, the stone cast 32 shown in FIG. 3. Before the stone is cast, wax plugs are inserted in box 26 to make openings such as that shown at 34 to permit removal of the dowel pins by pressing a suitable tool against end 14. Slots are cut in cast 32 adjacent each pin to free them from the cast.

As depicted in FIG. 3, the U-shaped wire 24 and the plastic ring 18 are rigidly held within the stone cast. Thus, when the dowel pin 10c is partially removed as shown, wire 24 and ring 18 remain fixed in position in the cast.

The dowel pin may be accurately reseated in its socket in proper relationship to the other teeth in the cast by pressing it all of the way into the socket until the contact surface 16 touches wire 24. This is shown in detail in the cross-sectional view of FIG. 4. When a pin such as 10b in FIG. 3 is fully inserted in the socket, an electrical connection exists between the pin and wire 24. Proper seating may be determined by connecting a series circuit consisting of probes 40 and 42, battery 44 and light bulb 46 between the conductive spur 17 and the end of wire 24. If the bulb lights, the dowel pin is properly seated. If it does not, the pin is not properly seated and must be repositioned. When the die material 28 is conductive, electrical contact may be made by touching probe 40 to the die material rather than to the spur.

As discussed above, wire 24 is used to support the dowel pins while the die material is setting and also provides an electrically conductive path for checking the seating of the pins. Wire 24 may be unprotected as shown in FIGS. 2-4 or it may be partially embedded in a plastic U-shaped flexible strip 60 as depicted in FIG. 6. Strip 60, which may be made of polyethylene, is provided with a plurality of regularly spaced holes 62 located adjacent wire 24 to accommodate dowel pins 10. The spacing of the holes is chosen to permit the insertion of the pins at locations corresponding to teeth in the mouth. When the pins are fully inserted in strip 60, the contact surface of the pins touches the exposed surface of wire 24. Thus, when the plastic strip and wire are embedded in the cast after the stone is poured, the dowel pins will only make electrical contact with the wire if they are fully inserted in the socket. The supporting strip of FIG. 6 makes it somewhat simpler to attach the dowel pins to wire 24 and permits more accurate positioning of the pins prior to pouring the die material.

FIG. 5 shows an embodiment of the invention in which wire 24 is replaced by a conductive wire grid 50. The grid is placed over the dowel pins prior to forming the cast, the individual squares in the grid being bent to fit over the contact surfaces of the dowel pins. The portion of each dowel pin below contact surface 16 is preferably made of a nonconductive material to avoid a false indication of proper seating in the event the pin touches grid 50 before it is fully inserted in the cast. This configuration has an advantage over the conductive wire 24 in that it is somewhat easier to conform to the placement of the dowel pins when a large number of pins are used.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:
1. Dental apparatus comprising
    (a) a cast having a plurality of sockets corresponding to the positions of teeth in the mouth,
    (b) resilient ring members located in each of said sockets,
    (c) an electrically conductive member rigidly embedded in said cast and having one end extending outside said cast, said conductive member being in intimate contact with each of said ring members,
    (d) a plurality of electrically conductive dowel pins adapted for insertion in said sockets and through the center of said ring members, each of said dowel pins having a contact surface for making electrical contact with said electrically conductive member when said pin is fully inserted in said socket, the ends of said dowel pins projecting from said cast being conductive replicas of the teeth, and
    (e) means for connecting a source of voltage between the ends of said dowel pins and the end of said electrically conductive wire.
2. Dental apparatus comprising
    (a) a cast having a plurality of sockets corresponding to the positions of teeth in the mouth,
    (b) an electrically conductive wire rigidly embedded in said cast, a portion thereof being positioned within each of said sockets, one end of said wire extending outside said cast,
    (c) a plurality of electrically conductive dowel pins adapted for insertion in said sockets, each of said dowel pins having a stud portion adjacent one end, said dowel pins making electrical contact with said electrically conductive wire when said dowel pins are fully inserted in said sockets, the ends of said dowel pins projecting from said cast being nonconductive replicas of the teeth, and
    (d) means for connecting a voltage source between the stud portion of said dowel pins and the end of said electrically conductive wire.
3. Dental apparatus comprising
    (a) a cast having a plurality of sockets corresponding to the positions of teeth in the mouth,
    (b) an essentially U-shaped non-conducting strip having a plurality of apertures spaced along the length thereof,
    (c) a U-shaped electrically conductive wire embedded in said strip parallel to one edge adjacent said apertures, said embedded wire and strip being positioned in said cast adjacent said sockets, and
    (d) a plurality of electrically conductive dowel pins adapted for insertion in said sockets, each of said dowel pins making electrical contact with said electrically conductive wire when said dowel pin is fully inserted in a selected aperture of said strip.

References Cited by the Examiner
UNITED STATES PATENTS 2,851,728  9/1958  Spalten et al. _____ 264—277 XR
2,932,015  4/1960  Kelly _____ 340—282

ROBERT F. WHITE, *Primary Examiner.*

ALEXANDER H. BRODMERKEL, *Examiner.*